United States Patent [19]

Maeda et al.

[11] Patent Number: 5,289,443
[45] Date of Patent: Feb. 22, 1994

[54] APPARATUS FOR PLAYING OPTICAL RECORDING MEDIA OF DIFFERENT RECORDING DENSITIES

[75] Inventors: Takanori Maeda; Takayuki Nomoto, both of Tokorozawa, Japan

[73] Assignee: Pioneer Electronic Corporation, Tokyo, Japan

[21] Appl. No.: 737,258

[22] Filed: Jul. 29, 1991

[30] Foreign Application Priority Data

Jan. 16, 1991 [JP] Japan .................................. 3-3412

[51] Int. Cl.⁵ .............................................. G11B 7/00
[52] U.S. Cl. .................................. 369/44.36; 369/44.41
[58] Field of Search ............... 369/44.35, 44.36, 44.41, 369/44.42, 124, 48

[56] References Cited

U.S. PATENT DOCUMENTS 4,972,400 11/1990 Kuwabara et al. ............... 369/44.35
5,126,988 6/1992 Nishiguma et al. ............... 369/44.42

Primary Examiner—Donald E. McElheny, Jr.
Attorney, Agent, or Firm—Keck, Mahlin & Cate

[57] ABSTRACT

An optical recording medium player reproduces a signal with lower intermodulation even in case of a reading laser beam for an optical recording medium is used having a wavelength different from a standard wavelength. The player comprises photoelectric converting means having a light receiving surface divided into central and peripheral regions, amplifying means for amplifying the output signals from the divided receiving surfaces, adding means for adding the outputs of each amplifying means, discriminating means for discriminating the type of a recording medium being played, and adjusting means for adjusting the sensitivities of signal processing systems including photoelectric converting means in accordance with the result of discrimination. Even in case the wavelength of reading laser beam of optical recording medium is different from the wavelength of reading laser beam as defined for a standard recording medium, it is possible to obtain a reproduction signal with less intermodulation.

4 Claims, 6 Drawing Sheets

TRACK DIRECTION

APPARATUS FOR PLAYING OPTICAL RECORDING MEDIA OF DIFFERENT RECORDING DENSITIES

BACKGROUND OF THE INVENTION

1. Field of the Invention

The present invention relates to a player of a recording medium for playing optical recording medium such as an optical disk where an information signal, e.g. an image signal, is recorded and for reproducing the information signal, and in particular to a player of optical recording medium, which can play both media carrying information at a high recording density and at a low recording density, respectively

2. Description of the Prior Art

As the light source for the optical recording medium player, a semiconductor laser is often used. At present, a semiconductor laser emitting near infrared light with wavelength of 780 nm is practically used as the light source for such optical recording medium player.

With the rapid development in a laser light source in recent years such as short wavelength semiconductor laser or laser source utilizing optical non-linearity, it is now becoming possible to use a laser light source, which emits a red light with wavelength of 670 nm, a green light with wavelength of 532 nm or a blue light with wavelength of 430 nm. If the information signal is recorded on an optical recording medium while using laser light source with such a short wavelength, it is possible to record an ultra-fine image signal or to miniaturize the optical recording medium. In this connection, new standards have been proposed using these types of laser.

In general, when a laser beam is irradiated on an optical recording medium, the spot diameter of the light on the recording medium is given by $$s = \lambda / NA,$$

where $\lambda$ represents a wavelength, and NA is a numerical aperture of an objective lens. That is, the shorter the wavelength is, the smaller the spot diameter can be. As a result, the pit length d1 of the medium formed by the light source with a short wavelength of $\lambda 1$ can be reduced down to about s1 ($= \lambda 1 / NA$), and it can be approximated as follows:

$$d1 = \lambda 1 / NA$$

The pit width is also approximately equalized to s1, and the gap between the adjacent tracks can be narrowed down. Thus, it is possible to manufacture an optical recording medium of a high recording density.

If a recording medium with a low recording density recorded by light source with near infrared laser wavelength $\lambda 0$ can be read by the light source with short wavelength $\lambda 1$ ($\lambda 0 > \lambda 1$), it is preferable because this can be used for playing the media of both high and low recording densities. The pit length d0 of the medium of low recording density is approximatly equal to the irradiation spot diameter s0 of the laser beam with wavelength $\lambda 0$, and it can be approximated as follows:

$$d0 = 0 / NA$$

On the other hand, the spot diameter s1 of the laser beam to read this is based on the relation d0>s1 from the relation of $\lambda 0 > \lambda 1$. Thus, the irradiation light spot diameter of high recording density is smaller than the pit length of the disk of low recording density. However, even in this case, it is possible to read the recorded signal on the medium, and the pit of the medium is of such structure, in the combination of a numerical aperture NA of an objective lens and the wavelength $\lambda$, as to minimize the generation of noise beam, which is the so-called intermodulation. When, as a result, the medium carrying information recorded to be read by means of a light beam with a wavelength $\lambda 0$ is read by a different light beam with a short wavelength $\lambda 1$, intermodulation occurs during the reading operation.

OBJECT OF THE INVENTION

An object of the present invention is to provide a player for an optical recording medium, which can reproduce signals with lower intermodulation even when the information signal recorded on an optical recording medium is read by a reading beam having a different wavelength from a predetermined wavelength for the particular optical recording medium.

SUMMARY OF THE INVENTION

According to the present invention, an optical recording medium player is provided which drives an optical recording medium having information signal optically recorded thereon for reproducing said information signal from light beam optically modulated through said recording medium by irradiating a light beam on said recording medium, which comprises:

photoelectric converting means having a light receiving source for receiving said modulated light beam and being divided into at least one central region and at least one peripheral region;

adding means for adding output signals issued from said central region and said peripheral region;

discriminating means for discriminating the types of said optical recording medium in playing; and sensitivity adjusting means for reducing a sensitivity of a signal processing system including said central region below a sensitivity of a signal processing system including said peripheral region in accordance with the result of discrimination of said discriminating means.

DETAILED DESCRIPTION OF THE PREFERRED EMBODIMENTS

In the player for optical recording medium according to the present invention, the modulated light beam obtained by irradiation light beam on the recording medium is received by photoelectric converting means having light receiving surface divided into at least a central region and at least a peripheral region. When it is discriminated that the type of the recording medium in playing is a medium other than a desired standard, a sensitivity of a signal processing system including the central region is reduced below that of a signal processing system including the peripheral region.

Figure 1A:
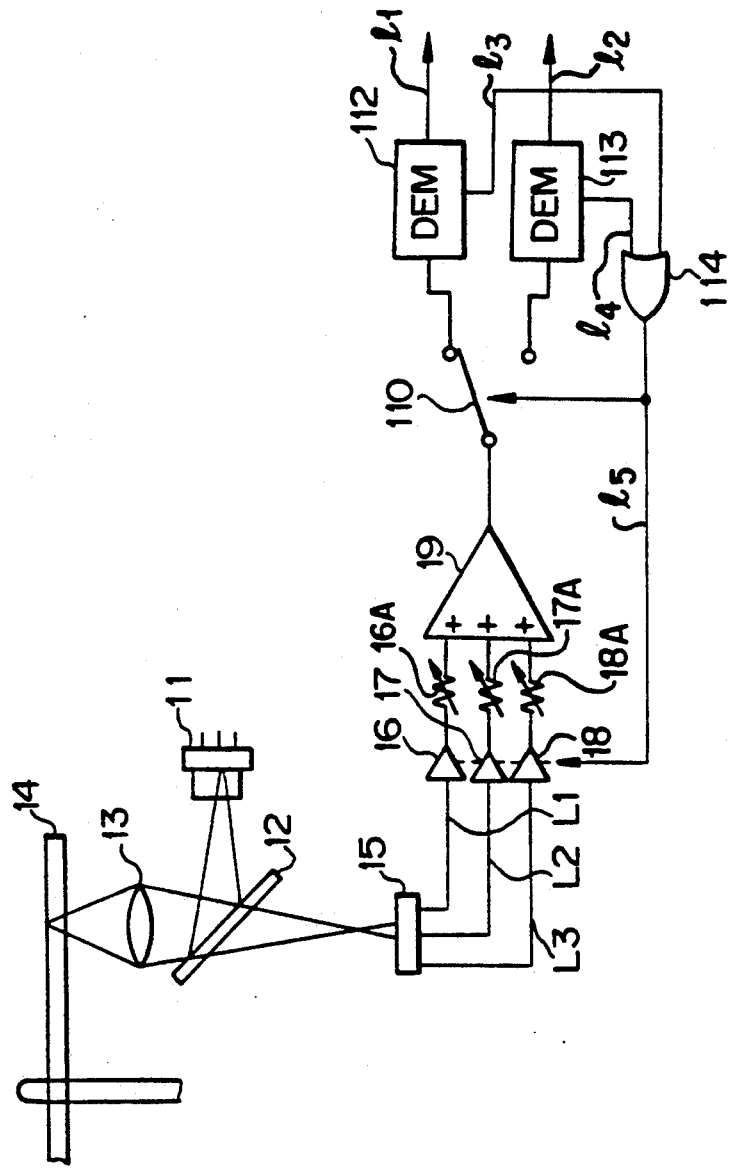
FIGS. 1A and 1B are block diagrams showing block diagrams of a first embodiment according to the present invention.
Figure 1B:
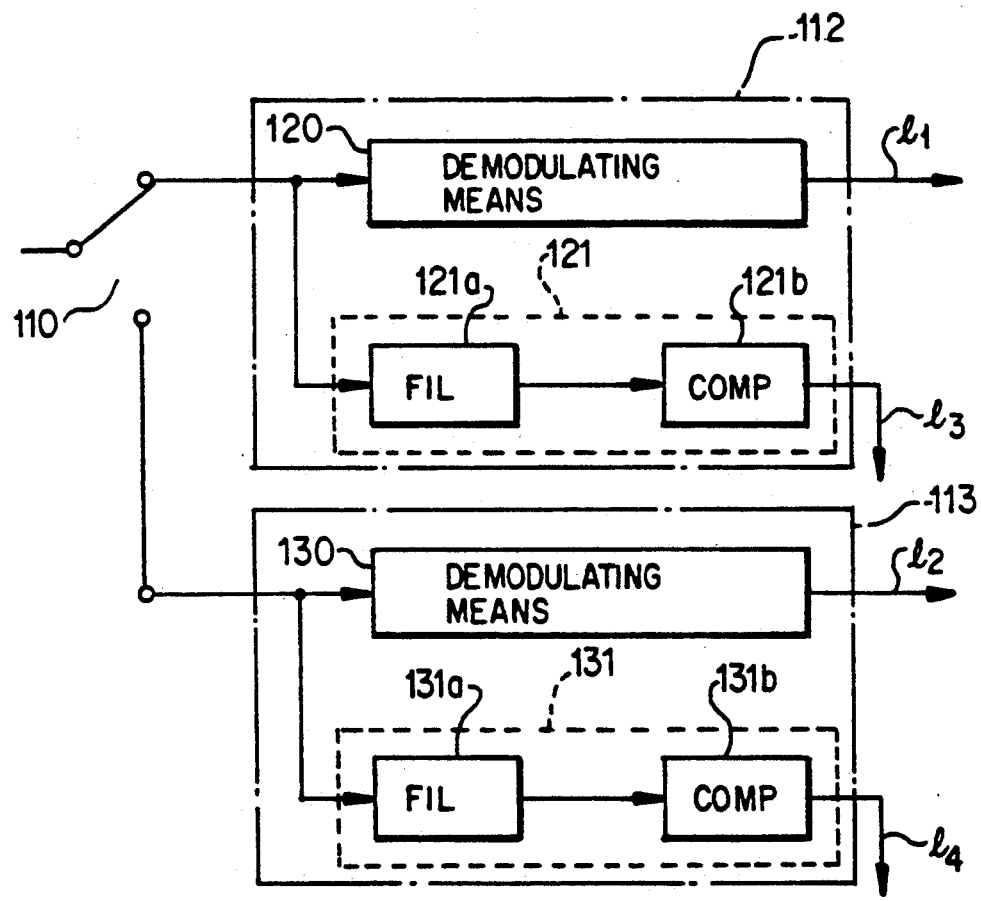

FIGS. 1A and 1B, the light beam with wavelength $\lambda 1$ emitted from laser light source 11 is reflected by a beam splitter 12 and is sent to an objective lens 13. The light beam converged by the objective lens 13 is irradiated on an optical disk 14 which is an optical recording medium. As the optical disk 14, two types of disks are used: a disk of high recording density as recorded at the standard t be reproduced by the apparatus of FIG. 1 (hereinafter referred as "standard A disk") and a conventional type disk of low recording density having different pit structure from the standard A disk (hereinafter referred as "standard B disk").

Figure 2:
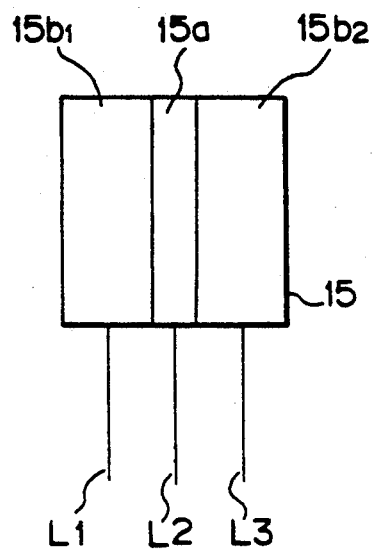
FIG. 2 is a diagram showing a divided light receiving surface of a photodetector shown in FIG. 1.

The return light from the optical disk 14 enters the beam splitter 12 through the objective lens 13. This return light has a polarization plane deviated by 90° from the light emitted from laser light source 11 and enters the photodetector 15 without being reflected by the beam splitter 12 and going straightforward. As shown in FIG. 2, the photodetector 15 is a photodetector having a light receiving surface, which is divided into a central region 15$a$ and peripheral regions 15$b$1 and 15$b$2 on both sides of the central region.

The return light impinging the light receiving surface of the photodetector 15 is converted to an electric signal, which is a light receiving signal, is issued through the lines L1, L2, and L3. Each of the light signals is amplified by the amplifiers 16, 17, and 18 having variable amplification degree and are added by an adder 19 which can be referred to as adding means.

The output of the adder 19 is supplied to a distributor (switch) 110 and is selectively relayed through one of two output terminals. Each of the output terminals is connected to a demodulator 112 for the standard A disk and to a demodulator 113 for the standard B disk. Being apparent from FIG. 1B, the demodulators 112 and 113, respectively, include not only demodulating means 120 and 130 for demodulating the input signals into standard A demodulated signal and standard B demodulated signal appearing on lines $l_1$ and $l_2$ but also discriminating means 121 and 131 for discriminating whether the disk is a standard A disk or a standard B disk. The discrminating means 121 comprises a filter 121$a$ which passes the carrier frequency of, for example, the standard B disk and a comparator 121$b$ for comparing the level of the output of the filter 121$a$ with a reference level so as to produce a signal on line $l_3$ when the carrier signal level exceeds a reference level. The discriminating means 131 includes a filter 131$a$ for passing therethrough the carrier B signal and a comparator 131$b$ for producing a signal on line $l_4$ when the level of the output from the filter 131$a$ exceeds a reference level. Namely, based on the results of the discrimination, the discrimination signals are generated for the standard A and the standard B and appear on discrimination signal output lines $l_3$ and $l_4$. The discrimination signals are transmitted to the amplifiers 16, 17, and 18 and the distributor 110 through an OR circuit 114. When the discrimination signal indicates that the standard A is being played, a signal appears on line $l_5$ which causes the distributor 110 to continue relaying the signal from the adder 19 to the demodulator 112 and the ratio of the amplification degrees of the amplifiers 16, 17 and 18 are made equal to each other. When the discrimination signal issued from the demodulators 112 or 113 takes a value which indicates that the standard B is being played, a gain of the amplifier 17 is made below the gain of the amplifiers 16 and 18, and the output of the distributor 110 is supplied to the demodulator 113. The amplifiers 16, 17 and 18 may be the so-called variable gain amplifiers adapted to change their gains in response to the signal form the line $l_5$ so as to comply with such condition.

Next, description is given for the operation of the circuit of FIG. 1.

The return light reflected by the disk 14 has the same light flux as that of objective lens pupil and is irradiated on the light receiving surface of the photodetector 15. The return light contains the 0-th diffraction beam and the primary diffraction beam. The primary diffraction beam has a phase changing relative to 0-th diffraction beam in accordance with a pit carrying a recording signal. Accordingly, the intensity of the return light changes in accordance with the recording signal at a portion where 0-th diffraction beam and primary diffraction beam overlap with each other.

Figure 3:
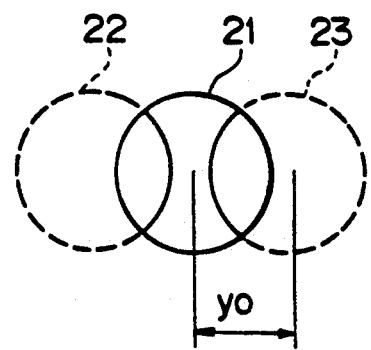
FIG. 3 is a diagram showing a return light entering into the photodetector shown in FIG. 1.

FIG. 3 shows the intensity distribution of the return light on the light receiving surface of the photodetector 15 when the light beam with wavelength of $\lambda 1$ is irradiated on the recording surface of a standard A disk. The primary diffraction beams 22 and 23 are partly overlapped with 0-th diffraction beam and each center thereof is deviated from the center of the return light 21 by a distance y0. The distance y0 changes according to the carrier frequency f0 contained in the return light and is given by:

$$y0 = f0 \cdot \lambda 1/(NA \cdot v),$$

where NA is a numerical aperture of the objective lens 13, and v is a linear velocity for tracking the disk 14. The arrows in a lateral direction in FIG. 3 indicates the time base direction of the disk, i.e., a track direction.

In case two or more carrier frequencies are included in the return light, an intermodulation occurs which corresponds to the sum or the difference of such frequencies. For example, it is supposed that the signals with different carrier frequencies such as image signals and sound signals are synthesized and recorded on a disk. In this case, an intermodulation between a central frequency f0 of an image carrier and a sound carrier frequency f1 (f1>f0) occurs. The intermodulation by f0+f1 has a larger distance y0 and gives almost no influence on the return light, whereas the intermodulation by f0−f1 exerts influence on the return light.

Figure 4:
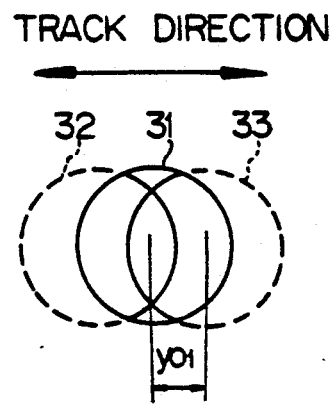
FIG. 4 is a diagram showing noise diffraction beams caused by intermodulation entering the photodetector shown in FIG. 1.

In this case, the distance y01 between the center of the return light and that of either one of the noise diffraction beam by intermodulation is expressed by:

$y01=(f0-f1)\lambda\cdot 1/(NA\cdot v)$ and such noise diffraction beams 32 and 33 as shown in FIG. 4 are generated by intermodulation. It is usual to determine the standard for the optical pit structure so as to minimize this intermodulation. But, the optical condition is not satisfied and the intensities of the noise diffraction beams 32 and 33 increase in case signals are read by laser beams with wavelengths of different standards as in the present case. It is to be understood that other diffraction beams exist in the radial direction of the disk, but it is not described here because the influence on the return light by those diffraction beams is negligible.

Figure 5:
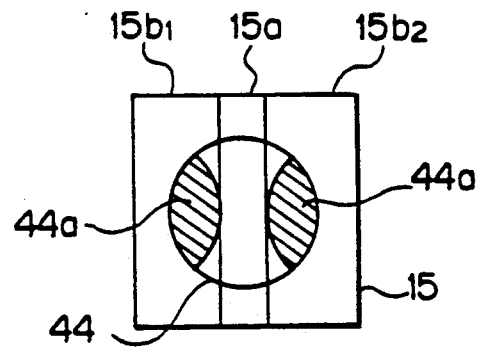
FIG. 5 is a diagram showing a primary diffraction beam on the photodetector shown in FIG. 1.

In the return light on the light receiving surface of the photodetector 15, intermodulation occurs in different manners with respect to the standard A disk and the standard B disk. That is, the return light reflected from the standard A disk contains almost no intermodulation, while intermodulation occurs in the return light from the standard B disk. FIG. 5 shows the return light 44 from the standard A disk on the light receiving surfaces 15a, 15b1, and 15b2 of the photodetector 15. In this return light 44, only the primary diffraction beam 44a and 0-th diffraction beam are contained, and any noise diffraction beam by intermodulation is not contained almost at all. If, therefore, it is supposed that the ratio between amplification degrees of the amplifiers 16, 17, and 18 is 1:1:1 and a reproduction signal is obtained from the adder 19 which is the same as in the case of the reproduction after amplification by photoelectric conversion of the return light obtained from a signal light receiving surface, which is not divided.

Figure 6:
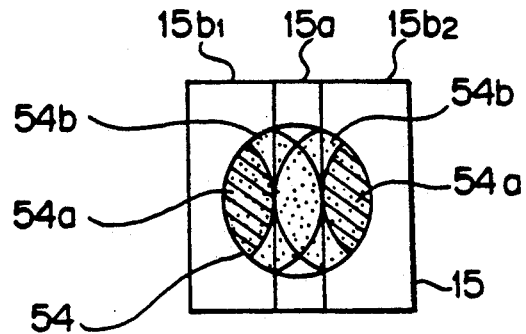
FIG. 6 is a diagram showing a return light including a noise diffraction beam on the photodetector shown in FIG. 1

In case of the standard B disk, the primary diffraction beam 54a bearing the recording signal and the noise diffraction beam 54b are contained in the return light 54 on the light receiving surface as shown in FIG. 6. Particularly, in such spindle-shaped region on the light receiving surface 51a, two noise diffraction beams are overlapped, and the light quantity of noise diffraction beams increases. On the other hand, the primary diffraction beam enters the light receiving surfaces 15b1 and 15b2, but it does not enter the light receiving surface 15a almost at all.

When, therefore, the disk being played back is discriminated as the B type, the ratio of the amplification degrees of amplifiers 16, 17, and 18 is made to be 1:0:1 and the gain of the amplifier 17 receiving the receiving signal from the light receiving surface 15a is made zero. Even with such reduction of the gain of the amplifier 17, there does not mostly appear any influence on the light receiving quantity of the primary diffraction beam. Accordingly, the portion with the highest light quantity of noise diffraction beam is eliminated. The output signals of the respective amplifiers are added to each other by the adder 19, and a resultant signal without influence by the noise diffraction beam is supplied to the demodulator.

By discriminating the type of a disk being played back and adjusting the gain for the respective output signals from the divided photo-sensitive surfaces as described above, it is possible to reproduce a good signal from a disk of any standard. There is no need that the demodulator contains the discriminating means, and the disk may be discriminated by various detection manner. In this instance, it is to be understood that either independent discriminating means or manual changeover means by the user may be used. In the present embodiment, the sensitivity is adjusted by the adjustment of the gain of the amplifier, whereas it may be adjusted by independent sensitivity adjusting means from the amplifiers, e.g. variable resistances (i.e., 16A-18A, and in FIG. 9, 106A-108A and 116A-118A) provided on the post-stage succeeding to the amplifiers.

Figure 7:
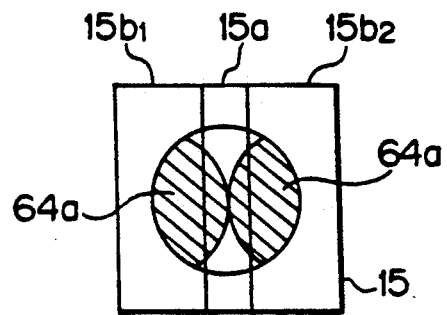
FIG. 7 is a diagram showing a return light entering the photodetector shown in FIG. 1, where distribution is different from that of FIG. 2.
Figure 8:
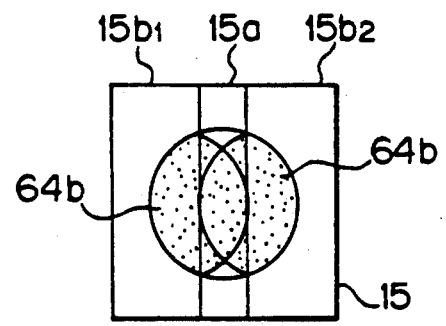
FIG. 8 is a diagram showing a noise diffraction beam caused by intermodulation in case of FIG. 7 entering the photodetector of FIG. 1.

In the example mentioned above, description has been given to a case where there appears a space frequency which causes such two diffraction beams as shown in FIG. 2 to largely deviated from each other. However, in case these diffraction beams are closer each other, e.g. there appear such primary diffraction beams 64a as shown in FIG. 7 or such noise diffraction beams 64b as shown in FIG. 8, the intermodulation caused by those noise diffraction beam can be substantially reduced by using such photodetector 15 as shown in FIG. 2 and adjusting the gains of the amplifiers. In this case, however, the light quantity of the primary diffraction light on the light receiving surface 15a is not negligible, and the optimal ratio between the gains of the different amplifiers should be selected in view of the ratio of the light quantity of the necessary primary diffraction beam to the quantity of noise component intermingled with it.

Figure 9:
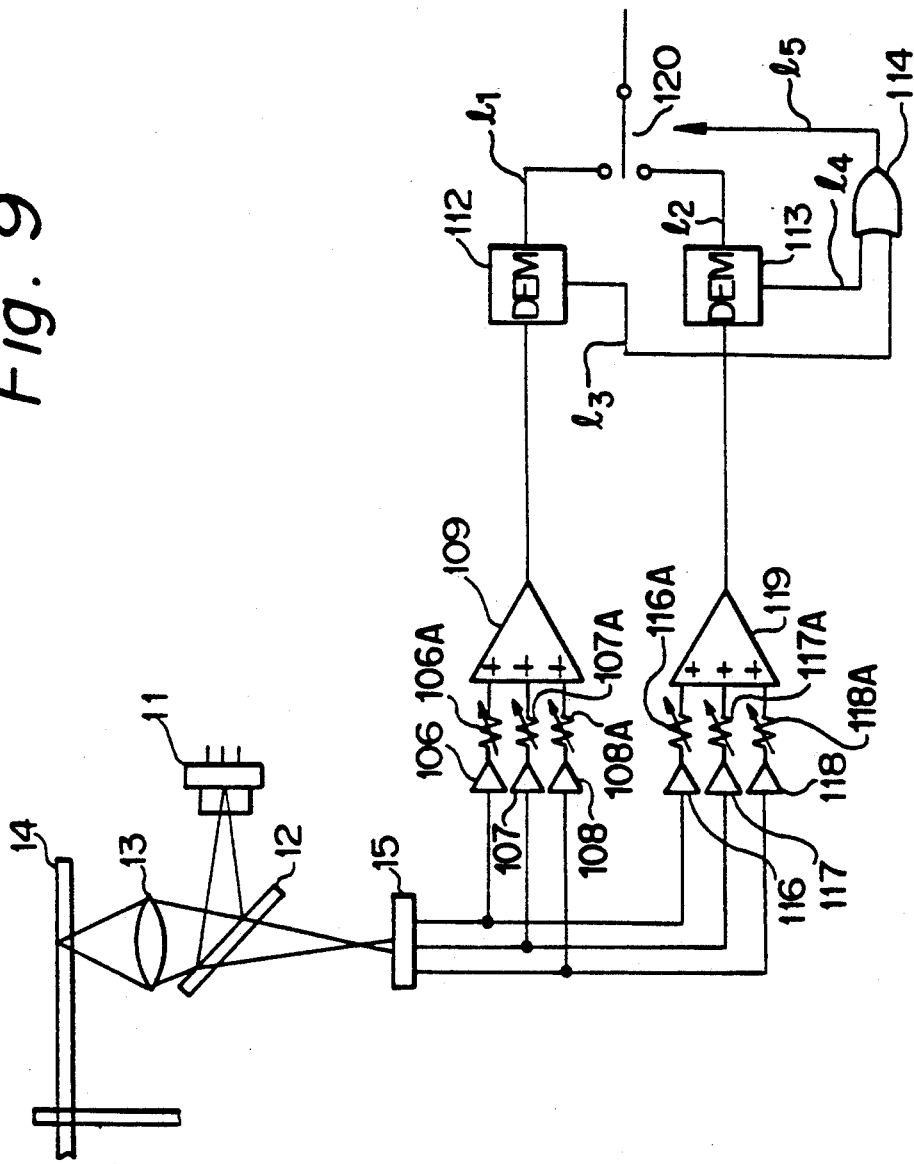
FIG. 9 is a block diagram of a second embodiment of the invention.

In the first embodiment, the ratio between gains of those amplifiers is changed according to the standard of the disk. In the second embodiment, there are provided two signal processing systems corresponding to the standard A and the standard B disks as shown in FIG. 9. In FIG. 9, the output of the photodetector 15 after photoelectric conversion is supplied in parallel to amplifiers 106, 107, and 108 having gains a ratio between which is defined for the standard A disk and further to amplifiers 116, 117 and 118 having gains a ratio between which is defined for the standard B disk. The respective outputs of the amplifiers 106, 107, and 108 are supplied to the demodulator 112 after being added to each other by an adder 109. The outputs of the amplifiers 116, 117, and 118 are supplied to the demodulator 113 after being added to each other by an adder 119. The outputs of the demodulators 112 or 113 are selectively outputted by the switch 120 in accordance with the standard of a disk to be played back. The corresponding components in FIGS. 1 and 9 are referred to by the same reference numerals.

Figure 10:
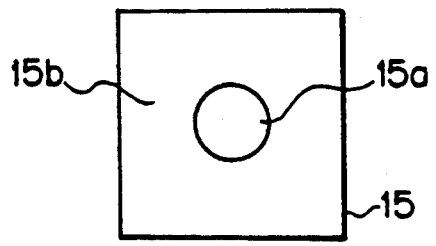
FIG. 10 is a diagram showing a variation of the light receiving surface of FIG. 2.

In the first and second embodiments, 3-division photodetector having divided areas of rectangular shapes is used, while, as shown in FIG. 10, the central region 15a may be formed in a circular shape, and the remainder may be made as a peripheral region. In this case, the output of central region 15a and the output of peripheral region 15b are amplified by two amplifiers. As the other embodiments, the number of divisions may be increased, or division may be made in a longitudinal direction, or division may be made in compliance with the shape of the diffraction beam. In order to provide the function for obtaining focus error signal, it is possible to provide an incident light with an astigmatism and to perform 4-division of cross lines. Further, it is possible to independently adjust the sensitivity of the photodetector 15 itself, which is photoelectric converting means so as to change the gains of the respective signal processing trains for the divided outputs from the photodetector.

In the above two embodiments, the optical system for standard A is furnished, and the amplification ratio is made to be a unitary level 1 in all cases when the standard A disk is reproduced, whereas, in case intermodulation becomes an issue, it is possible to change the amplification ratio so that the intermodulation is always minimized regardless of the standard of the disk. In short, it should be arranged that the sensitivity of the signal system including photoelectric converting means having divided light receiving surfaces and an amplifier is regulated in accordance with the difference of the patterns on the light receiving surface between the primary diffraction beam carrying a recorded information and the noise beam caused by intermodulation.

As described above, in the player of optical recording medium according to the present invention, the light receiving surface of photodetector is divided into at least one central region and at least one peripheral region, and the signals amplified by different gains are demodulated. Accordingly, it is possible to perform satisfactory signal reproduction with lower intermodulation even in case the wavelength of the reading laser beam is different from the wavelength of the reading laser beam predetermined only for a standard recording medium.

The disk used in the embodiments is the so-called CLV disk, in which linear velocity does not change on inner and outer peripheries, while a space frequency changes in accordance with the radial position of the reading spot on the disk in case of so-called CAV disk having constant angular velocity. In case of such disk, there may be provided such an arrangement as to change the gain ratio between those amplifiers in accordance with a signal representing the radial position of the reading spot or point on the disk being played.

What is claimed is:

1. An optical recording medium player for driving an optical recording medium carrying thereon an information signal optically recorded thereon and for reproducing said information signal from a light beam optically modulated through said recording medium caused by irradiation of a light beam on said recording medium, which comprises:

photoelectric converting means having light receiving surface for receiving said modulated light beam and being divided into at least one central region and at least one peripheral region;

adding means for adding output signals obtained from said central region and peripheral region;

discriminating means for discriminating the types of said optical recording medium being played back; and sensitivity adjusting means for reducing the sensitivity of a signal processing system including said central region below the sensitivity of a signal processing system including said peripheral region in accordance with the results of discrimination by said discriminating means.

2. An optical recording medium player according to claim 1, wherein said sensitivity adjusting means adjusts the gains of the amplifiers included in said signal processing systems.

3. An optical recording medium player according to claim 1, wherein said sensitivity adjusting means reduces the sensitivity of said central region of said photoelectric converting means compared with the sensitivity of said peripheral region.

4. An optical recording medium player according to claim 1, wherein said sensitivity adjusting means comprise a variable resistor in series between heading means and said at least one central region of the photoelectric converting means, and a further variable resistor in series between said adding means and said at least one peripheral region of the photoelectric converting means.

* * * * *